Jan. 3, 1933.  P. M. MILLER  1,893,334
METAL WHEEL
Filed Jan. 24, 1930
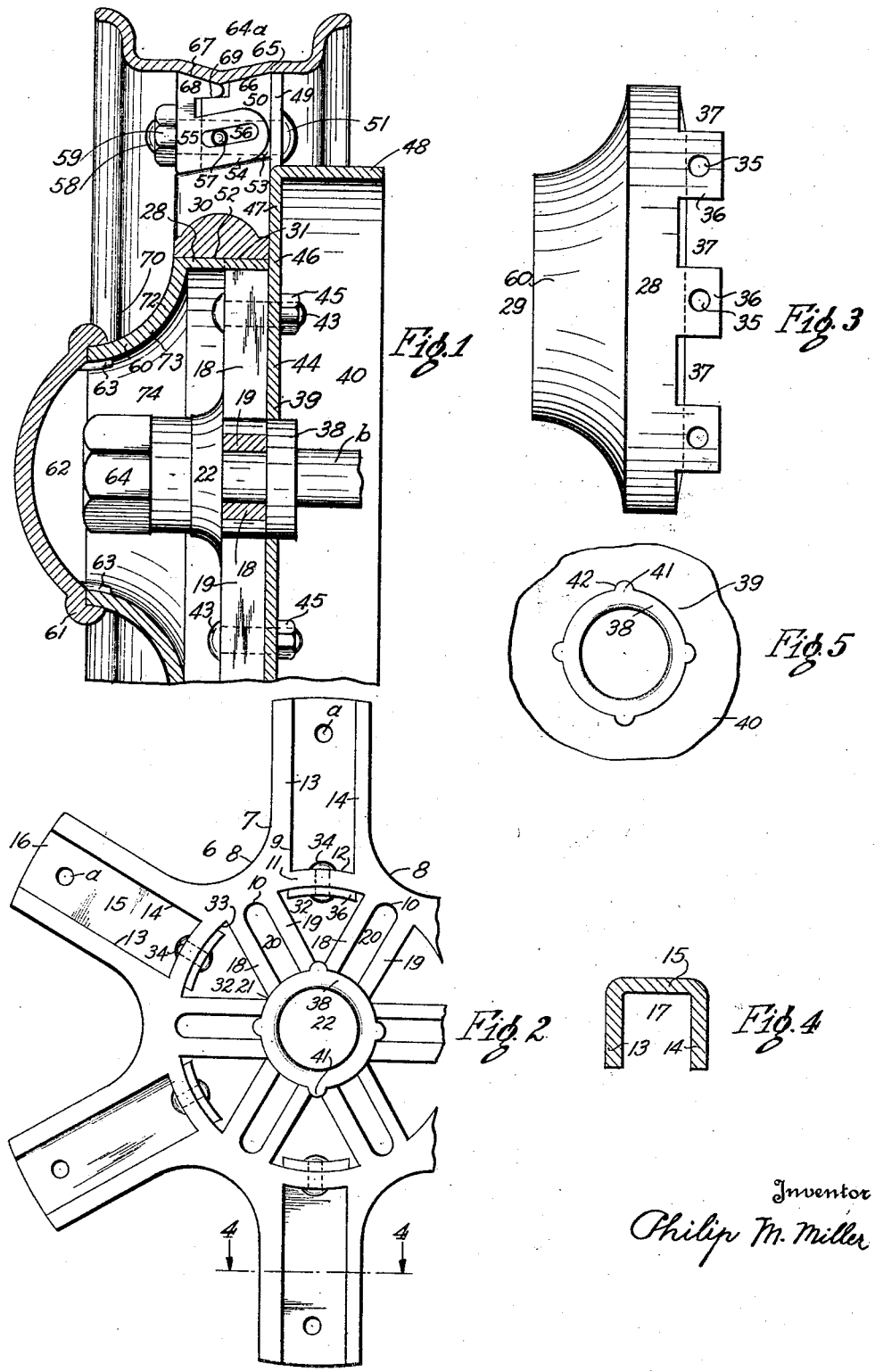
Inventor
Philip M. Miller Patented Jan. 3, 1933

1,893,334

UNITED STATES PATENT OFFICE

PHILIP M. MILLER, OF YOUNGSTOWN, OHIO, ASSIGNOR TO MILLER DEVICES INC., OF NEW YORK, N. Y., A CORPORATION OF NEW YORK

METAL WHEEL

Application filed January 24, 1930. Serial No. 422,993.

The present invention relates to automobile wheels in general and has for its object to provide a wheel construction which is used with light and heavy duty vehicles, the purpose being to construct a light, strong, economical artillery type wheel having considerably short spokes each provided with an open channel and radiating from a light central base which is merged with spaced, slotted columns radiating from the hub body of the wheel spider structure, each spoke being provided with a free end, whereby air circulation is supplied to the construction that continually cools it and dissipates the heat generated by road friction, the manufacture of which may be easily carried out and will result in a superior product.

With the construction of the radiating slotted columns merging with the outer annular base and inner or hub annular base thereby forming the central hub portion, a cylindrical shell member which is telescoped with the central part of the hub portion, constitutes together with the hub portion, the central part of the completed wheel construction, which compensates for the material necessary to produce the central part of the conventional malleable or steel cast wheel, and at the same time the central part of the finished product is hollow and strong to support the adjacent parts of the structure.

Other objects and advantages of the invention in particular will be better understood from the description of the particular embodiment thereof for the purpose of which description reference should be had to the accompanying drawings forming a part hereof and in which—

Fig. 1 is a vertical cross section of the wheel construction embodying the invention applied thereto;

Fig. 2 is a side elevation of the wheel structure showing the inner face embodied with features of construction of the invention applied thereto;

Fig. 3 is a side perspective view of the shell member employed in constructing the central part of the wheel;

Fig. 4 is a cross section of Fig. 2 taken on the line 4—4 and indicated by the arrows; and Fig. 5 is a view showing the engagement of the inner portion of the hub body with the central part of the drum.

The invention in the form illustrated is designated by corresponding characters referring to parts thereof, in which, as shown in Fig. 2, the wheel spider structure 6 comprises radiating spokes 7, one merged with another providing an outer peripheral arched portion 8. Extending laterally inward and centrally inward each arched portion is merged with the inner portions 9 of the spokes and the central arched portion 10. The inner side portions 9 of each spoke are merged with an arched portion 11 which merges with the adjacent arched portions 8 and 10 to collectively provide an outer annular portion capable of supporting the spokes 7 in position for a concrete structure. Extending radially outward from the outer face 12 of each arched portion 11 are two spaced, parallel walls 13 and 14 both merging with the front wall 15 and together terminating in the free end 16. By means of merging the parallel walls 13 and 14 with the front wall 15, a channel 17 shown in Fig. 4 is formed. Extending radially inward from the inner face or portion of the arched portion 10 and the sides of each arched portion 11 are columns 18 and 19 merged with the outer peripheral face of the hub thereby forming a triangular contact and a slot between two columns as shown at 20 and 21. As particularly shown, while the columns 18 and 19 are in parallel relation one to another and extend from the arched portion 8 between two spokes 7 and thereby provide the slot 20 therebetween and merging with the face 21 of the hub body 22, they provide a triangular space between opposite columns and the arched portions merged with them.

For the purpose of completing the construction, the cylindrical portion 28 of the cylindrical shell member 29 shown in Fig. 3 is inserted into the chamber 30 provided in the central part of the spider structure as shown in Fig. 1, the outer portion 31 of the cylindrical flange 28 being passed into the triangular space 32 and engaging with the inner face 33 of each arched portion 11, and a rivet member 34 is passed through an opening 35 provided in the tongue 36 of the shell member 29 and an opening in the portion 11 and the parts riveted together in a manner such that the outer side of two parallel columns 18 and 19 is engaged in one recess 37 of the shell member 29. By means of the engagement of each extended tongue 31 and 36 in one triangular space 32 and riveting to the arched portion 11, the parallel columns 18 and 19 are in a recess 37 of the shell member 29, thereby circumferentially securing the latter in snug position in the chamber of the spider structure and providing a central enlarged, outwardly extended, curved or arched portion, which forms means to strengthen the construction and to replace the excessive material employed to make the central part of the conventional wheel structure solid in order to give rigidity to the construction.

To the outer face of the inner portion 38 of the hub body 22 is secured the central portion 39 of the drum member 40, and the integral portion 41 is keyed in the recess 42 of the drum as clearly shown in Fig. 5 at four points, but it may be keyed by any suitable number of integral portions engaging in recesses of the drum. Extending radially outward, the wall 44 of the drum is in contact with the inner sides of the structure after the bolts 43 have been passed through apertures such as the slots 20 of the columns 18 and 19 and the apertures in the wall of the drum and locked by the nuts 45 each secured on the end of each bolt. The extended portion 46 of the drum is continued to the formation of the portion 47 which is merged with the transverse flange 48. Extending radially outward from the drum is an individual member 49 engaged with the inner sides of the parallel walls 13 and 14 of each spoke. When the extended portion 49 is in snug contact with the inner face of the head 50 of the spoke, bolts 51 are passed through an opening in the portion 49, through the channel 17 of the head 50 and through an opening a in the front wall 15 of the head, and extended outwardly and crimped against the outer face of the wall 15, which crimping may be substituted by a nut secured on the exposed portion of the bolt, thereby locking the extension 49 together with the entire head 50 of the spoke to prevent their separation.

In connection with the arrangement of each extension 49 in rigid contact with the head 50 of the spokes, the drum member 40 as a whole is in rigid engagement with the spider structure and each channel 17 of the spokes is closed to prevent entrance of extraneous substances thereinto. With the connection of the drum on the inner portion of the hub and keying the central part of the drum with the hub as clearly shown at 41 and 42 in Fig. 5, a driving connection is provided therebetween and the position of the drum as a whole is strengthened to form means contributory toward reinforcing the rigidity of the spokes of the entire structure to the extent that, as a whole, the completed construction is light, strong, inexpensive and provides means whereby air circulation is supplied to the construction that is continually cooled and the heat generated by the road friction is dissipated.

For the purpose of operating the wheel construction in connection with means to lock and unlock a demountable rim on the free spoke ends thereof, each head portion 52 is provided with an inclined seat 53 formed in each side thereof, which is engaged by a side portion 54 of the bifurcated clamp member 55 seating on the front inclined portion of the seat 53. Each side portion 54 is provided with a slot 56 wherethrough the pin 57 is passed outwardly from its fixed position in the side of the head 50, to secure the clamp member in position for a sliding engagement on the side inclines 53. The extended portion 58 of the bolt 51 is in threaded engagement with the nut member 59 which has a permanent connection in a slot in the front wall of the clamp member 55 adapted to carry the same along in the direction of movement of the nut member in relation to locking and unlocking on the end of the bolt.

To the outer circular portion 60 of the shell member 29 is engaged the outer cylindrical portion 61 of the cover member 62 by means of the side members 63 which extend from the inner face of the cover member, to provide a closed chamber and exclude extraneous substances from entering into the chamber and contacting with the exposed portion 64 of the hub body 22 provided for carrying bearing mechanism and the axle b of a vehicle.

In connection with the securing of the extensions 49 of the drum 40 in rigid engagement with the heads 50 of the spokes of the spider structure, the outer peripheral faces of the spokes are greatly extended, and the tire-rim 64ª is mounted thereon. The outwardly radially inclined portion 65 of the rim is in contact with the inclined portion 66 of the spoke, while the inwardly radially inclined portion 67 of the rim is in contact with the inclined portion 68 of the clamp member 55. When the nut member 58 is operated on the portion 59 of the bolt 51 laterally inward, the clamp member is moved and the rim is clamped by the inclined portions 66 and 68, thereby holding the rim in alignment and preventing its separation from the wheel structure. When the nut member is operated reversely on the bolt, the clamp member is moved outwardly laterally on the side inclined seats 53 of the spokes thereby providing clearance to pass the rim from the wheel.

With the provision of the inclined portions 65 and 67 of the rim converging towards the center line of the rim, bearings are provided to rigidity align the rim on the wheel. The base of the rim may be rolled in or pressed in to form an approximately V-shaped central portion which may be of the same thickness as the entire cross section of the rim, to provide the inwardly converged bearing surfaces shown at 65 and 67.

By means of the inclined face 69 of the outer portion of each spoke end 50, the wedge portion 68 of the clamp member 55 is firmly wedged between the rim and wheel to the extent of forcing the entire rim on the wheel, whereby it is unnecessary to provide a broad bearing for each side of the rim and wheel.

Owing to the shell member 29 in the central chamber formed between the diametrical faces of the outer central portion of the spider structure, a deeply seated chamber is provided by the curved or arched contour shown at 70 as indicated by the arrow, and a concave surface 72 and a convex surface 73 are thereby provided to complete the chamber 74 of the shell 29.

By means of providing the curved or arched lines with the shell member, which may be cast integrally with the spider structure instead of having the shell member formed independently, the finished product is provided with lines of construction which are desired by the car manufacturer and which are instrumental in the provision of an outstanding central part of the wheel construction.

The cover member 62 which is removably attached to the outer portion of the shell member is also provided with curved or arched lines in order to harmonize the contour of the member with the contour of the shell member in order to increase the prominence of the central part of the wheel. The means of securing the cap member on the shell member may be of any desired type to provide a practical connection therebetween.

As a result of the casting of the spider member in the form which embodies arched outer peripheral portions and arched central portions including the triangular spaces formed by the radiating bifurcated columns which connect the outer arched periphery with the central or hub periphery, a light, strong, economical construction is provided, having means of embodying in the construction short, sturdy spokes capable of supporting a demountable rim with a tire.

While I have illustrated and described my invention in general, I desire it to be understood that the principle of the invention is susceptible to a wide range of variation, modification and substitution without departing from the scope and spirit of the claims.

Having thus described my invention, what I desire to secure by Letters Patent is:

1. In a vehicle wheel, an artillery spider structure comprising radiating spokes merged at the inner ends to provide a circumferential base, a central hub body, radiating spaced columns between and integral with the said circumferential base and said central hub body, an arched deeply formed cup-shaped member arranged in the central part of the spider structure and fixed to the said circumferential base thereof, in combination with a brake drum member fixed to the said radiating columns and inner end of the hub body of the spider structure, a removable cap member having means on the inner face of the outer portion thereof engaged with the inner face of the outer end of the said arched cup-shaped member for completing the enclosure of the outer portion of the hub body and central portion of the spider structure and excluding entrance of extraneous substances thereinto, and means locking the said brakedrum member in its respective position.

2. A vehicle wheel construction comprising a spider structure including radiating spokes merged at the inner ends to provide a circumferential base, a central hub body having engaging means on its inner end, radiating spaced columns between and integral with the said circumferential base and said central hub body, a cup-shaped member open at the inner and outer ends arranged in the central part of the spider structure and fixed to the said circumferential base thereof, a brakedrum member fixed rigidly to the radiating columns and the engaging means on the inner end of the hub body of the spider structure to prevent circumferential movement therebetween and to strengthen the position of the radiating columns and circumferential base with reference to the spoke ends of the spider structure, members extended from the outer end of the said brakedrum member each arranged to contact with the inner side of each spoke, bolts fixed in and passed through each said extended member and spoke to strengthen the position of said brakedrum member and the ends of the spokes, a removable cover member having means engaged with the inner face of the outer end of the cup-shaped member to cooperate with the said latter member to complete the enclosure of the outer portion of the hub body and central portion of the spider structure for preventing entrance of extraneous substances thereinto.

3. A vehicle wheel construction comprising an artillery spider structure having radiating hollow spokes and a merged circumferential base, a central hub member having engaging means on its inner end, radiating spaced members arranged between and integral with the central portion of the spider and the said hub member thereby completing the spider structure, a deeply formed member arranged and fixed in the central part of the spider structure to enclose the outer portion of the said hub member, a brake drum member fixed to the inner side of the spider structure to strengthen the position of the inner side of the spider structure with reference to the inner portion of the hub body thereof, locking means fastening the brakedrum with the radiating spaced members of the spider structure, the central portion of the brakedrum member being provided with means adapted to engage said engaging means on the inner end of the hub, members extended outwardly from the outer end of the brakedrum member and each arranged to cover the hollow portion of each end of the spokes of the spider structure to strengthen the position of said brakedrum member and to prevent entrance of extraneous substances into the hollow portion of each spoke, bolts passed axially outwardly through the said extended members and the spokes to rigidly fasten the said members with the said spokes, and a removable cap member having engaging means engaged with the inner face of the outer end of the deeply formed member to enclose the outer portion of the hub body and to prevent entrance of extraneous substances thereinto.

4. In a wheel for motor vehicles, a one-piece cast artillery type spider member formed with a central transversely-extended hub portion, columns projecting radially from the hub for a substantial distance, providing an open central spider portion which lightens the spider member and ventilates the wheel, said columns merging into an annular spider body which is formed with relatively short hollow peripheral projections defining the spokes of the wheel, and a deeply drawn cup-shaped member mounted on the outboard side of the spider member and enclosing the open central portion thereof, said member being formed with projections extending between the outer ends of the columns of the spider and secured to the said annular body.

5. In a wheel for motor vehicles, a one-piece cast artillery type spider member formed with a central transversely-extended hub portion, open columns projecting radially from the hub for a substantial distance, providing an open central spider portion which lightens the spider member and ventilates the wheel, said columns merging into an annular spider body which is formed with relatively short peripheral projections defining the spokes of the wheel, said spokes being channel shaped with the open portions of the channels facing the inner side of the wheel, and a deeply drawn cup-shaped member mounted on the outboard side of the spider member and enclosing the open central portion thereof, said member being formed with projections extending between the outer ends of the columns and secured to the wall of the said annular body at the bases of the spokes, a removable cap being applied to the outer end of the said cup member to prevent entrance of extraneous matter into the central open portion of the wheel.

PHILIP M. MILLER.